United States Patent [19]

Dowd et al.

[11] Patent Number: 4,902,068
[45] Date of Patent: Feb. 20, 1990

[54] MODULAR HEADLINER ASSEMBLY

[75] Inventors: James D. Dowd; Darrel Hampton, both of Farmington Hills, Mich.

[73] Assignee: United Technologies Automotive, Inc., Dearborn, Mich.

[21] Appl. No.: 205,139

[22] Filed: Jun. 10, 1988

[51] Int. Cl.$^4$ .............................................. B60J 7/00
[52] U.S. Cl. ..................................... 296/214; 29/453; 296/97.13
[58] Field of Search ...................... 296/214, 37.7, 37.8, 296/97.13; 29/453 X, 469; 24/174

[56] References Cited

U.S. PATENT DOCUMENTS

| | | | |
|---|---|---|---|
| 3,889,320 | 6/1975 | Koscik | 24/73 PM |
| 4,149,749 | 4/1979 | Canal | 296/214 |
| 4,178,035 | 12/1979 | Cziptschrisch | 296/97 K |
| 4,241,870 | 12/1980 | Marcus | 296/37.7 |
| 4,352,522 | 10/1982 | Miller | 296/214 |
| 4,390,202 | 6/1983 | Flowerday et al. | 296/97 K |
| 4,404,709 | 9/1983 | Janz et al. | 16/111 R |
| 4,553,309 | 11/1985 | Hess et al. | 29/450 |
| 4,610,478 | 9/1986 | Tervol | 296/214 |

FOREIGN PATENT DOCUMENTS 0057886 8/1982 European Pat. Off. .

Primary Examiner—Robert R. Song

[57] ABSTRACT

A modular headliner assembly for use with motor vehicle includes a substrate, sunshade assemblies and fasteners for securing the modular headliner to motor vehicle body structure. Snap-in fasteners are provided for allowing the modular headliner to be mounted to the motor vehicle. A method of assembly including the steps of locating the modular headliner with extending fasteners relative to openings in the body structure and displacing the fasteners into the openings to secure the headliner to the body structure.

34 Claims, 5 Drawing Sheets

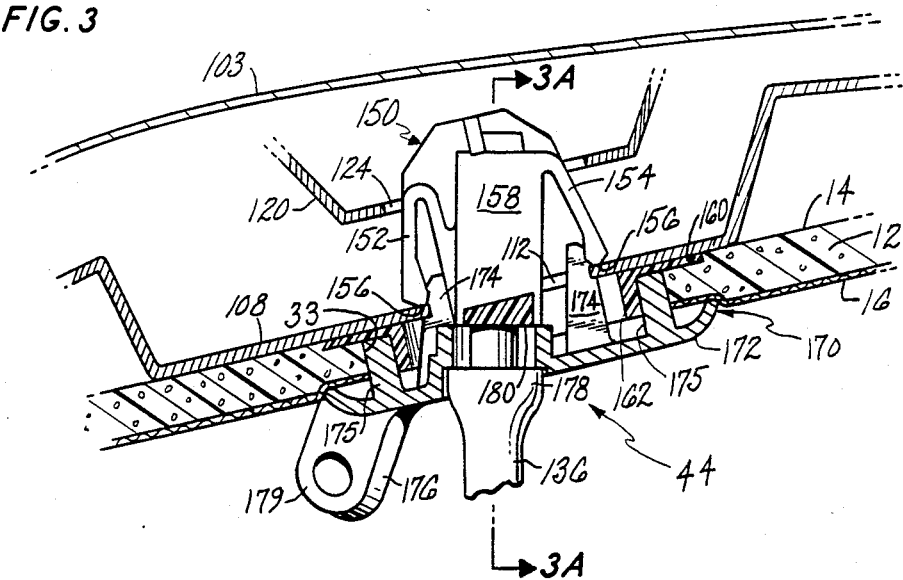
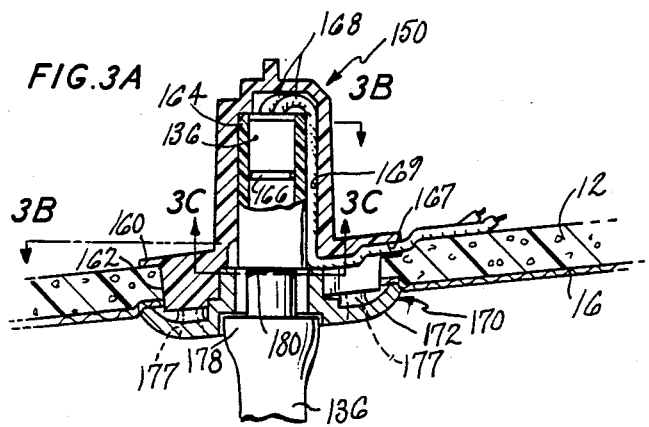
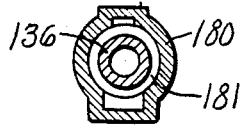
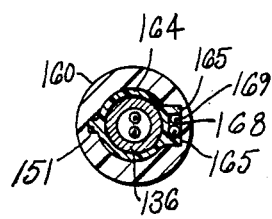

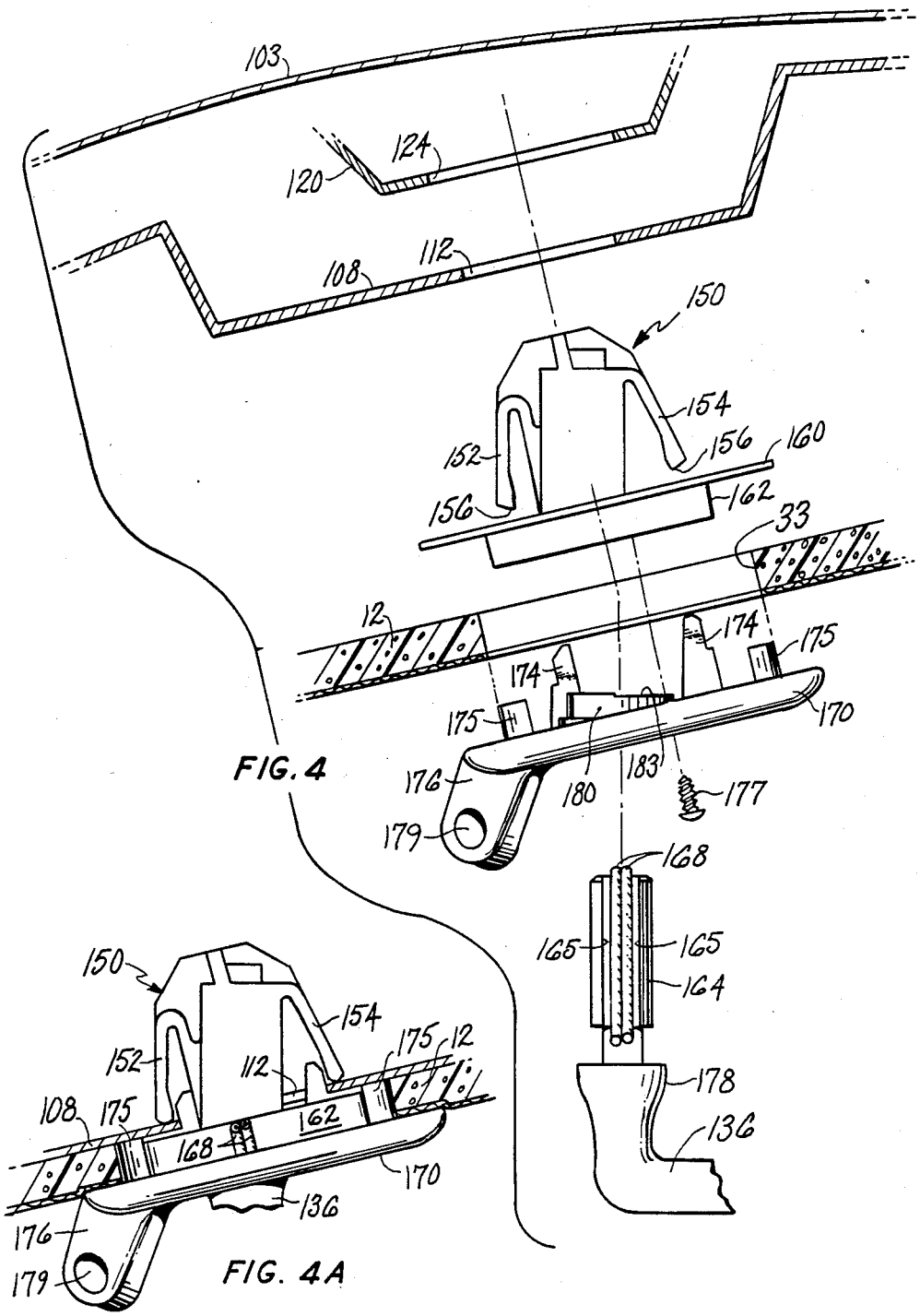

MODULAR HEADLINER ASSEMBLY

CROSS REFERENCE TO RELATED APPLICATIONS

This application relates to the following simultaneously filed patent applications: U.S. application Ser. No. 204,804 for HEADLINER AND SUNSHADE FASTENER by James D. Dowd, David M. Hilborn, Roy Weilant and Abdolhossein R. Lawassani; U.S. Application Ser. No. 204,663, for MOTOR VEHICLE BODY STRUCTURE FOR RECEIVING SNAP-FIT MODULAR HEADLINER FASTENERS by James D. Dowd and David M. Hilborn; U.S. application Ser. No. 204,662, for ASSIST STRAP FOR A MODULAR HEADLINER by James D. Dowd, David H. Hilborn, Matthew J. Brown and Richard P. Bozyk; U.S. application Ser. No. 205,193 for SUNSHADE WITH SNAP-FIT FASTENER U.S. application Ser. No. 205,257 for ASSIST STRAP FOR A MOTOR VEHICLE by James D. Dowd, David M. Hilborn, and Matthew J. Brown; U.S. application Ser. No. 205,150 for SUNSHADE FASTENER MODULE FOR USE WITH MODULAR HEADLINER by James D. Dowd, David M. Hilborn, Roy Weilant, and Abdolhossein R. Lawassani; U.S. Application Ser. No. 205,130 for FRONT LAMP MODULE AND SUNSHADE SUPPORTS FOR MODULAR HEADLINER by James D. Dowd, David M. Hilborn, Roy Weilant, and Abdolhossein R. Lawassani; U.S. Application Ser. No. 205,265, for CONSOLE MOUNTED TO A HEADLINER by David M. Hilborn and Stephen P. McGarry; U.S. application Ser. No. 205,131, for MODULAR HEADLINER INCLUDING A WIRE HARNESS by James D. Dowd, Darrel Hampton, and Stephen P. McGarry.

TECHNICAL FIELD

The present invention relates to modular headliner systems for use with a motor vehicle and particularly headliner systems which may be assembled as a unitary module to the interior of the motor vehicle.

BACKGROUND OF THE INVENTION

Motor vehicles have been assembled on an assembly line, wherein specific individuals perform various tasks to assemble the vehicle. One of the series of tasks necessary to assemble the vehicle is to provide an appropriate interior structure adjacent the roof of the vehicle. This arrangement typically requires a series of stations on the assembly line, and a series of operators, one or two at each station, such that a headliner substrate can be initially inserted through either the windshield or rear window opening into the interior of the vehicle. The headliner substrate will then be mounted to the interior side of the roof of the vehicle. Said substrate would include a decorative side facing downwardly to be viewed by the occupant of the vehicle and a non-show side facing the roof. At subsequent assembly stations fasteners would be installed to secure the substrate to the vehicle, and sunshade assemblies would be assembled to the vehicle as well as assist straps, coat hooks, and other accessories which are mounted to the headliner within the vehicle. Additionally various lights and wiring would be added either to the roof of the vehicle prior to the mounting of the substrate or thereafter such that appropriate electrical connections may be made between a light and the vehicle body electrical system. Typically electrical connections are made from each light mounted to the headliner to an appropriate connector in the body electrical system.

It has been estimated that to perform all of the above operations requires as many as seven locations on the vehicle assembly line and up to thirteen operators to install the various components in the motor vehicle.

In order to reduce the number of work stations necessary to accomplish all this assembly on the assembly line it is deemed desirable to form a modular headliner assembly which may be installed in the motor vehicle as a unitary component. The modular headliner assembly described herein includes all the various components to be assembled to the roof or headliner of the vehicle such that the assembly of the module to the vehicle completes this part of the assembly operation.

More specifically the modular headliner may include items such as sunshade assemblies, assist straps, coat hooks, lighting modules, illuminated vanity mirrors, displays, sunglass holder compartments, storage compartments, switches, rearwardly facing brake lights, and a center high mounted stop lamp (CHMSL), as well as integral wiring harnesses with simplified connections to the vehicle body electrical system. The modular headliner must also have an appropriate decorative surface exposed to occupant of the vehicle.

In many vehicles the headliner substrate is positioned in the vehicle in the desired assembled position by the use of an alignment pin which is inserted through a sunshade opening in the substrate into an opening in the sheet metal of the body structure of the vehicle to align the substrate. Thereafter the alignment pin is removed and the sunshade assembly is inserted therethrough and screwed to the vehicle body structure to assemble the sunshade and headliner substrate to the vehicle. Other portions of the headliner may be thereafter screwed to the vehicle body structure to likewise secure the substrate thereto. To accomplish this type of assembly operation the operator must physically enter the vehicle or sit on the door sill and reach upwardly over his head to drive the screws. Should the screwdriver slip or the operator otherwise make an error, then the decorative surface of either the sunshade or substrate may be damaged. Additionally the constant sitting and standing and entering and exiting the vehicle creates significant strain on the headliner installer.

The herein described assembly is designed to be mounted to the vehicle body structure without requiring screw fasteners. The headliner assembly is snapped into position and the operator doing the assembly may manipulate the assembly to determine by feel when the headliner assembly is appropriately aligned. The installer may then displace the assembly with his hand to cause the assembly to snap-in to its assembled position. It contemplated that the sunshade fastener securing the sunshade to the headliner will include appropriate features to snap-fit the assembly including the headliner into the body structure of the vehicle. It is likewise contemplated that assist straps mounted toward the rear of the substrate will snap-fit into openings in the body structure of the vehicle to secure the headliner to the vehicle. All of this assembly operation may be accomplished with the operator physically standing outside the vehicle and reaching in through the door or window openings to feel the appropriate headliner positioning and thereafter to manually push or strike the appropriate portion of the headliner to cause it to be secured in its assembled position. Hence with this mounting method a pair of installers may perform all the installation functions previously accomplished at a single station, and may perform all the functions previously accomplished by multiple installers operating from plurality of sequential stations. An electrical connection may be made through a headliner wire harness connector to a mating body electrical connector possibly at the vehicle A-pillar location.

Additionally by the assembly of the modular headliner at an off assembly line where the time to assemble is location not related to the vehicle assembly line it is possible to achieve economies of scale and independence from the speed of the assembly line such that the headliners may be assembled in the most economic manner. It is contemplated that the modular headliners will be fully assembled at some location not immediately adjacent to the assembly line and will be delivered to the assembly line for installation at the appropriate location.

SUMMARY OF THE INVENTION

It is an object of the present invention to provide a modular headliner assembly for use with a motor vehicle.

It is another object of the present invention to provide a modular headliner assembly which may be snap-fit into a motor vehicle.

It is a further object of the present invention to provide a modular headliner assembly which is assembled into a modular unit prior to assembly into a motor vehicle.

It is another object of the present invention to provide a modular headliner assembly which may be assembled to motor vehicle without the necessity of utilizing screws.

It is a further object of the present invention to provide a modular headliner assembly which includes sunshade fasteners having snap-fit portions and wherein the sunshade fastener retains the sunshade in the desired position and acts to secure the headliner assembly to the vehicle body structure.

A further object of the invention is to provide a safe, economic, reliable, easy to manufacture and assemble modular headliner assembly.

A further object of the present invention is to provide a safe, economical, reliable, and easy to utilize method of assembling a modular headliner to a motor vehicle.

Other objects will be apparent from the description to follow and the appended claims.

The above objects are achieved according to preferred embodiment of the invention by the provision of a snap-in modular headliner assembly for use with a motor vehicle. A snap-in modular headliner assembly includes a headliner substrate conformed to fit within the interior of a motor vehicle, first and second sunshade assemblies, a first sunshade fastener mounted to the substrate including means for securing the first sunshade thereto and first snap-in fastener means extending therefrom and a second sunshade fastener mounted to the substrate including means for securing the second sunshade thereto and second snap-in fastener means extending therefrom. The snap-in fastener means are positioned to extend from the headliner assembly such that each may mate with openings in the vehicle body structure of the motor vehicle to secure the headliner in position.

Also disclosed is a modular headliner assembly which may be mounted within a motor vehicle as a single module including a substrate formed to fit within the desired space within the motor vehicle, said substrate having a decorative surface facing the interior of the vehicle and a non-show surface; a first sunshade affixed to the substrate and positioned to serve as a front seat driver's side sunshade when the headliner assembly is mounted to the vehicle and a second sunshade affixed to the substrate and positioned to serve as a front seat passenger's side sunshade when the headliner assembly is mounted to the vehicle. The modular headliner further includes additional elements such as a console, lamp module, wiring assembly, assist straps and other accessories.

Also disclosed is a modular headliner assembly which may be installed as a single unit within a motor vehicle wherein the motor vehicle includes a body structure having at least one member which defines fastener receiving openings and the modular headliner has a substrate formed to fit within the desired space within a motor vehicle adjacent the body structure wherein the fastener receiving openings are located, said substrate having a decorative surface exposed to the occupants of the motor vehicle after the headliner assembly is assembled to the motor vehicle and a non-show surface facing the body structure wherein the fastener receiving openings are located and snap-fit fastener means mounted to the substrate including snap-fit fastener projecting portions sized and positioned to mate with the fastener receiving openings upon assembly of the headliner assembly to the motor vehicle.

Further disclosed is a method of mounting a modular headliner assembly including a substrate having snap-fit fastener means mounted thereto which includes snap-fit fastener projecting portions, a partially assembled motor vehicle including body structure having at least one member which defines fastener receiving openings, said motor vehicle also having large window openings, which includes steps of aligning the modular headliner assembly with a large window opening in the motor vehicle, inserting the modular headliner assembly through the large window opening, aligning the snap-fit projecting portions of the modular headliner assembly with the fastener receiving openings of the body structure, and snapping the projecting portions of the headliner assembly into the receiving openings of the body structure to secure the modular headliner assembly to the body structure.

Further disclosed is a method of mounting a modular headliner assembly including a first sunshade fastener having a snap-fit portion, a second sunshade fastener having a snap-fit portion and an accessory having a snap-fit portion to partially assemble the motor vehicle including a body structure defining fastener receiving openings and a large window opening which includes the steps of inserting the modular headliner assembly through the large window opening, aligning the various snap-fit portions with the appropriate fastener receiving openings, snapping the snap-fit fastener of the first sunshade fastener into the assembled position, snapping the snap-fit fastener of the second sunshade fastener into the assembled position, and snapping the snap-fit portion of the accessory into the assembled position whereby the headliner assembly is retained at the desired position relative to the body structure.

BRIEF DESCRIPTION OF THE DRAWINGS

FIG. 1A is a perspective view of FIG. 1 taken at the indicated line.

FIG. 3 is a partially sectional end view of a sunshade/headliner fastener shown mounted in the vehicle.

FIG. 3A is a partial sectional view of a portion of the sunshade/headliner fastener.

FIG. 3B is a sectional view of FIG. 3A taken at the indicated line.

FIG. 3C is a sectional view of FIG. 3A taken at the indicated line.

FIG. 4 is an exploded view of a headliner/sunshade fastener and vehicle parts to which it is assembled.

FIG. 4A is a side view of a sunshade fastener.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figure 1:
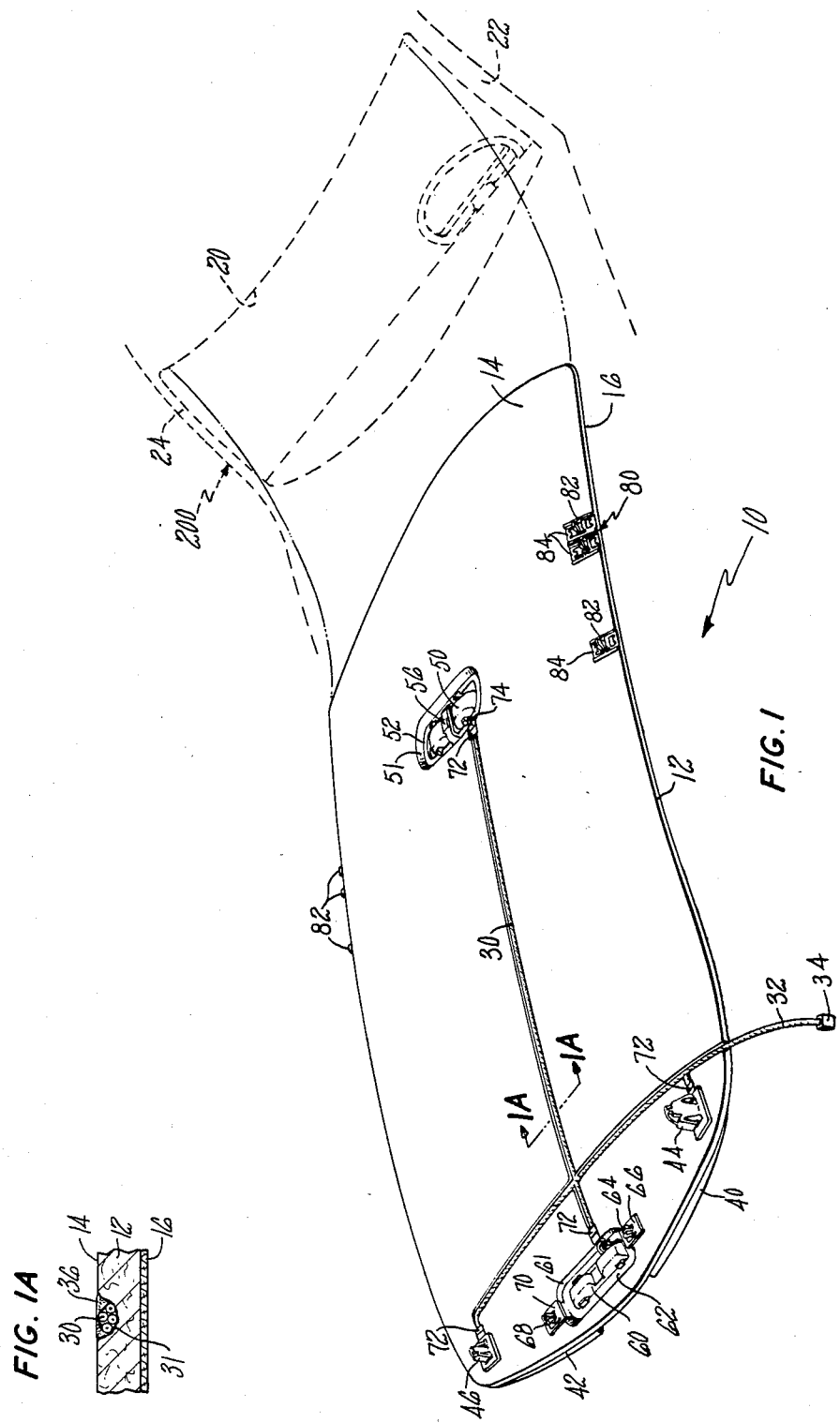
FIG. 1 is a perspective view of a modular headliner assembly positioned adjacent the vehicle windshield opening for assembly therethrough.

FIG. 1 is a perspective view of a modular headliner assembly 10 about to be installed into motor vehicle 200. The motor vehicle is shown having windshield opening 20, left A-pillar 22 and right A-pillar 24. The modular headliner is mounted into the partially assembled vehicle through the windshield or other large window opening which could also be the rear window opening. In this manner, the body structure of the vehicle may be assembled prior to the modular headliner assembly being mounted thereto.

Modular headliner assembly 10 consists of all those components between the decorative interior surface of the headliner and the body structure of the vehicle. The modular headliner 10 must be appropriately configured such that when assembled, the modular headliner may be shipped, handled and installed in the vehicle and potentially mistreated during a portion of this process without having the interior surface damaged, without distortion or bending due to uneven stresses and without impacting the function of the various components thereof.

As may be specifically seen in FIGS. 1 and 1A, the headliner includes substrate 12 made from a material such as molded fiberglass, styrene, cardboard, a polymeric material, or as is otherwise as known in the art. Substrate 12 has mounted on the surface thereof a decorative covering or surface 16 which is the surface visible to an occupant of the finished vehicle. The opposite side of substrate 12 from that on which decorative surface 16 is mounted is the non-show surface, surface 14.

Left sunshade 40 and right sunshade 42 are mounted to the substrate by the use of left sunshade fastener 44 and right sunshade fastener 46.

Additionally shown as part of the modular headliner are assist straps 80 which are retained to the modular headliner by retainers 84 interacting with assist strap legs 82.

Also shown as a portion of modular headliner 10 is center console 50 which is shown secured within depressed portion 51 formed in the substrate to retainer 52. A mesh fastener 56 is shown located to extend upwardly from retainer 52.

Likewise, forward console 60 is shown mounted within depressed portion 61 formed in the headliner in combination with forward retainer 62. Forward retainer 62 includes an outwardly projecting area through which left inboard sunshade support 64 and right inboard sunshade support 68 extend. Appropriate retainers 66 and 70 are shown for securing the legs of the inboard sunshade supports to hold the inboard sunshade supports in position.

Further shown as part of the modular headliner is wire harness 30 having a wire bundle 32, including a vehicle electrical connector 34 and a series of accessory connectors 72 located adjacent each accessory requiring electrical connections. Complementary connectors 74 extend from each and mate with accessory connectors 72 to form a completed wire harness. Vehicle electrical connector 34 is typically connected to a mating connection extending from the vehicle body electrical system in an easy to access area such as one of the A-pillars.

Additionally it may be seen that the modular headliner wire harness is secured within substrate channels 31 such that the wire is maintained therein. Additionally, adhesive 36 may be placed over the wire bundle to secure the wire bundle within the channel. In this manner, the wires are protected from inadvertent contact with roof bows or other roof structure and the potential for damage to the wires is avoided.

As may be seen in FIG. 1, the modular headliner assembly is about to be inserted into the vehicle for assembly thereto. The left and right sunshade fasteners, 44 and 46, extend upwardly and include legs for engaging with the metal structure of the vehicle to mount the same thereto. Likewise, assist straps 80 have upwardly extending legs 82 which engage appropriate openings in the body structure to also secure the modular headliner to the vehicle. Furthermore, mesh fastener 56 may appropriately interact with a corresponding mesh fastener to likewise secure the headliner to the body structure. Hence, the left and right sunshade fasteners and at least one of the two assist strap handles are used for securing the modular headliner assembly to the motor vehicle. Furthermore, the mesh fastener of retainer 52 may likewise serve such a function. Also not to be ignored are the right inboard sunshade support and the left inboard sunshade support which also includes legs for engaging the sheet metal structure of the vehicle.

In order to assemble the modular headliner to the vehicle, the headliner is slid through a large window opening such as a windshield and placed in general position to which it is to be mounted. An operator then positions one of the sunshade fasteners to feel when the fastener mates with an appropriate opening. The sunshade fastener is then snap-fit into the opening to mount that portion of the modular headliner. The same process is then followed with the other sunshade fastener, the assist straps and the inboard sunshade supports. In this manner, the entire modular headliner may be snap-fit to the motor vehicle. Thereafter, an appropriate electrical connection is made at vehicle electrical connector 34 and the assembly process for the headliner is complete.

Figure 2:
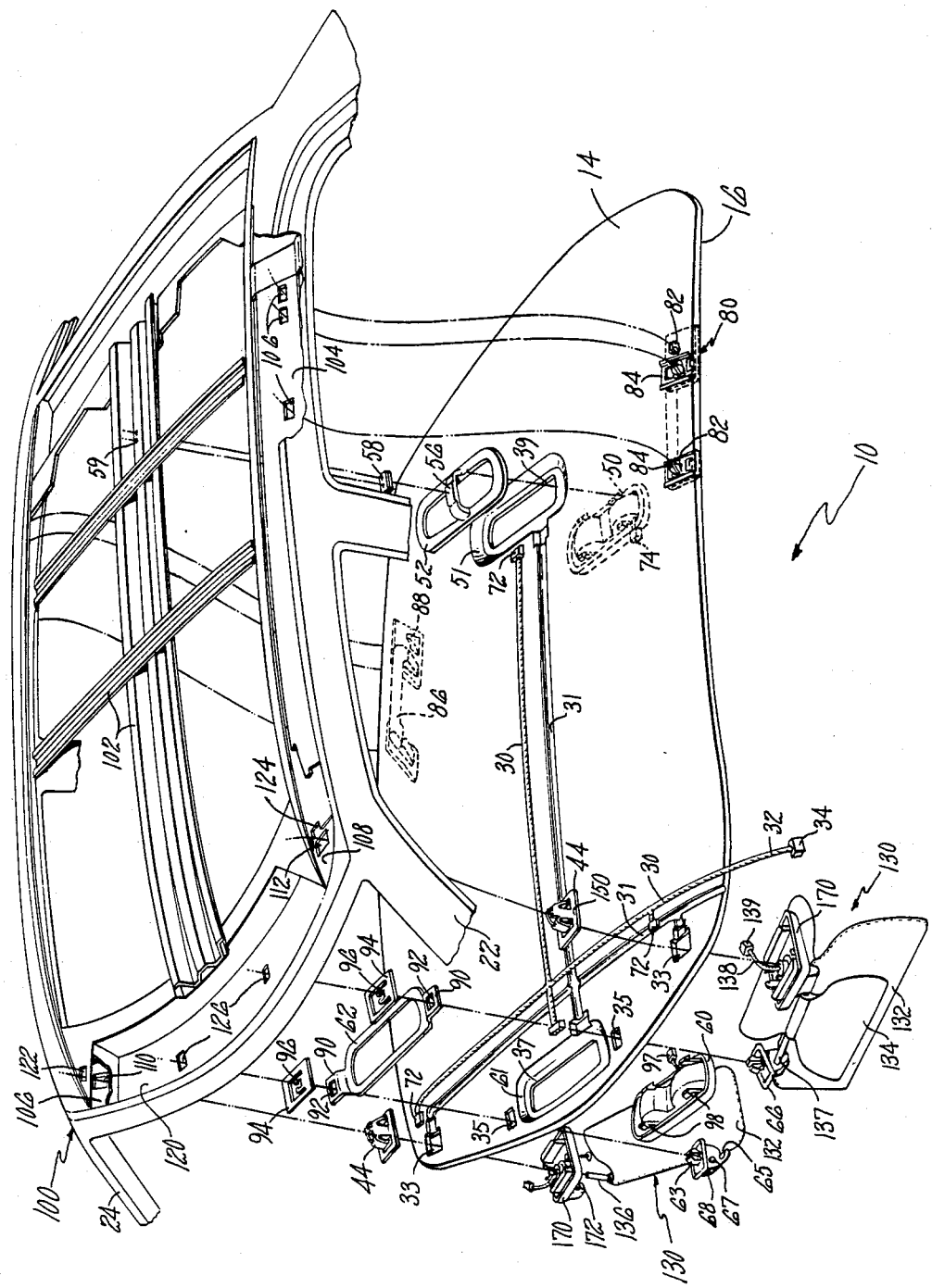
FIG. 2 is an exploded perspective view of a modular headliner assembly and appropriate portions of the vehicle body structure.

In FIG. 2 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 39, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure. This mesh retainer is preferably a Dual Lock retainer. By the selection of Dual Lock material, it is possible that the headliner may slide into position with one portion of the Dual Lock fastener sliding relative to the other. The Dual Lock fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 84 projecting through the headliner substrate. Retainers 82 are shown in engagement with legs 84 to secure the assist straps to the headliner. An assist strap may include handle 86 and a coat hook 88, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 2 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacle portions to due such.

FIG. 3 shows a partially sectional view of fastener 44 secured to a vehicle. As may be seen therein, the fastener is positioned below roof 103 and fits in opening 124 of header 120 and through left A-pillar opening 112 of A-pillar inner 108. Additionally, substrate 12 having a non-show surface 14 and decorative surface 16 are shown.

Fastener 44 has a cover 150 and base 170 which includes projection for receiving secondary visor 176 which defines an opening therein. Pivot rod flange 178 is shown encompassing pivot rod 136 although it might be considered to be a portion of the pivot rod as opposed to a portion of the base. Additionally, the base includes a torque fitting support 180 through which the pivot rod will extend. The torque fitting will engage the top of the torque fitting support such that the pivot rod is maintained to the base by the torque fitting engaging the torque fitting support. The torque fitting support may include a torque fitting opening 184 which allows the torque fitting to be inserted through the base, said torque fitting including a keyway and a wire guide area. Once the torque fitting is inserted through the torque fitting support, the torque fitting is then rotated to prevent its removal through the torque fitting support and is retained from rotation therein by torque fitting 183 indent. The cover then secures the torque fitting in the position to which it has been rotated.

Bezel 172 is shown extending generally parallel with substrate 12 and of sufficient area to engage substrate 12 such that substrate 12 will be pushed upwardly by bezel 172 as the fastener is mounted. Centering arms 174 and bezel ribs 175 are also shown extending upwardly from bezel 172.

Cover 150 defines a pair of flanges 152 and 154 extending outwardly therefrom These flanges are flexible and may be compressed to allow the cover to fit through the left A-pillar opening 112. Each flange has a curved end 156, and when inserted through the opening, the flange is compressed and as the cover approaches the fully inserted position, the flange bows outwardly with only the downward most end being received by the edges of the opening. The end of the flange is curved and the combination of the bowing of the flange and the curve provides a camming action which, once the flange is released, will cause the flange to snap behind A-pillar inner 108 as shown such that the flanges act to prevent the fastener from being moved downwardly. The center of cover 150 is defined as torque fitting receiving area 158 into which the torque fitting connected to the rod will be maintained. Cover 150 further includes platform portion 160 which engages the top surface of substrate 12 and the opposite surface of A-pillar inner 108 from the surface that the flanges engage. Cover 150 additionally includes a platform rib 162 extending downwardly from platform portion which acts to engage bezel 172 and bezel ribs 175 such that spacing is provided therebetween, said spacing being appropriately sized to receive substrate 12. The engagement of platform rib 162 and bezel rib 175 act to align the cover to the fastener and prevent any applied torque from rotating the base without transmitting the rotation to the cover and consequently the vehicle body structure.

Referring now to FIG. 3A, there may be seen a partial sectional view of the fastener. Therein, cover 150 is shown with torque fitting 164 contained therewithin. Torque fitting 164 is typically molded to the pivot rod. Annular indent 166 is provided on the pivot rod to engage the torque fitting to prevent linear displacement of the torque fitting along the pivot rod. Torque fitting 164 is maintained by cover 150 in the desired position, and will not rotate relative thereto. The rod, however, will rotate relative the torque fitting, and it is this torque relationship that provides the resistance necessary as the sunshade is pivoted between the position covering the windshield and the position covering the side window. Platform 160 and rib 162 are shown extending above the substrate, the rib acting to space the cover from the base.

Wires 168 are shown extending from rod 136 and are those wires used to supply power to the illuminated vanity mirror portions of the sunshade. Wires 168 exit upwardly from the pivot rod and then traverse downwardly within wire guide area 169. The wires then make a right angle turn and exit through wire opening area 167. The wires are then positioned at the top of the substrate and may have a connector located at the end thereof for connecting to the modular headliner wire harness.

Base 170 is shown having a bezel engaged to the substrate and is additionally shown having screws 172, 177 which may secure the base to the cover to form an integral fastener. Torque fitting support 180 is shown positioned to have torque fitting 164 resting thereon such that as the base is secured to the cover, the base through the torque fitting support will maintain the torque fitting in the desired position to secure the sunshade thereto. Pivot rod flange 178 and pivot rod 136 are also shown such that a decorative connection may be made between the pivot rod and the base. Pivot rod flange 178 may extend down the pivot rod and around a right angle bend therein.

FIG. 3B is a sectional view taken in FIG. 3A at the indicated location showing the various relationships between pivot rod 136 and the wires passing therethrough. Torque fitting 164 is shown encircling pivot rod 166 and includes key 151 extending outwardly to be engaged by the cover to prevent the torque fitting from rotating. Additionally shown are wire guide projections 165 defining a wire guide area 169 to which wires 168 may be enclosed and also serving to prevent the torque fitting from rotating.

FIG. 3C is a sectional view taken in FIG. 3A at the indicated location showing torque fitting opening 181 is sized to allow the rod with the torque fitting mounted thereto to pass through the torque fitting support. The rod and fitting are thereafter rotated such that the wire guide projections and the keyway of the torque fitting engage the torque fitting support to secure the torque fitting to the fastener. Torque fitting indent 183 helps retain the torque fitting in the rotated position prior to the assembly of the cover to the base.

FIG. 4 is an exploded view of the fastener showing how the various parts go together. Starting at the bottom, it may be seen that pivot rod 136 has pivot rod flange 178 and torque fitting 164 secured thereto. Wire guide projections 165 are shown with wires 168 secured therebetween. The orientation of the torque fitting is shown in the as assembled configuration and not in the orientation necessary to pass through the base.

Base 170 is shown having projection for receiving secondary visor 176 and an opening for the receipt of the secondary visor rod 137. The torque fitting support 180 is shown for the receipt of the torque fitting on the rod. Centering arms 174 are shown extending upwardly from base 170. Substrate 12 is shown defining a substrate opening 33 through which the fastener may pass. Cover 150 is shown having flanges 152 and 154, a platform portion 160 and platform rib 162. An A-pillar inner 108 defining an opening 112 and header 120 defining header opening 124 are shown both positioned below roof 103.

Upon assembly of the fastener, a number of interactions happen to help secure the entire assembly in the desired position. The pivot rod is first mounted to the base by the torque fitting including the pivot rod being inserted through the base and then rotated to its assembled position. The pivot rod is thereby secured relative to the base by the fit of the torque fitting against the torque fitting support. The base of the pivot rod is then placed against the substrate with the centering arms extending outwardly therethrough and the base ribs extending upwardly. Cover 150 is then secured to the substrate with platform portion 160 engaging the top of the substrate and platform ribs 162 extending downwardly therethrough within the substrate opening 33, said ribs acting to form a spacer between the base and the cover such that the substrate is maintained within the space defined by the spacer and said ribs engaging the cover ribs to align the cover to the base and to transmit torque between the cover and the base. Centering arms 174 also includes notches therein for engaging the A-pillar inner to additionally provide spacing. Furthermore, the coacting ribs extend upwardly from the base to coact with the platform ribs to both align the fastener, center the fastener, and to additionally provide means for spacing the cover from the support.

The fastener is assembled by screws being inserted to secure the base portion to the cover portion. Thereafter, the entire assembly may be snap-fit to the vehicle. As may be seen in FIG. 3, the unassembled position, the cover is forced through a A-pillar opening 112 thereby compressing legs 152 and 154. In this position, the legs or flanges readily fit through the opening. Once the legs or flanges have passed through the opening, they are released since they are no longer in contact of the opening, and the legs spring outwardly to engage the vehicle body structure on the opposite side of the A-pillar inner such that the sunshade and headliner are mounted to the A-pillar inner. In this manner, the entire modular assembly or simply a sunshade or a sunshade/headliner combination are maintained in the desired position. The curvilinear ends of the flanges act to assure that the flanges will snap outwardly. The incline or the generally pointed nature of the top of the fastener assures that the fastener will enter the opening correctly to facilitate the displacement of the fastener relative to the opening, said displacement acting to compress the flanges until they snap outwardly.

Opening 112 is sized to allow the cover to pass therethrough and then to allow the fastener to slide in the left/right direction as viewed from FIG. 4. However, centering arms 174 extend upwardly and engage the edges of A-pillar inner 108 which define opening 112 and prevent the fastener from sliding in the left/right direction as seen therein.

Header opening 124 defined by header 120 as can be seen in FIG. 4 is larger than the cover as inserted therein. However, in a plane perpendicular to the paper in FIG. 4, the header opening is sized to just receive cover 150, and hence movement of the fastener is limited, in the direction in and out of the paper, by the fit of the cover within the header opening.

Referring now to FIG. 4A, there can be seen a slightly different embodiment of the herein invention. In this embodiment, the fastener cover does not include a platform 160. Herein, the cover engages the A-pillar inner on one side and the base engages substrate 12 on the opposite side. This embodiment is specifically designed for subassembly as a fastener and sunshade combination to a vehicle or further in combination to also secure an already positioned headliner to the motor vehicle. It is contemplated that this fastener would be used with a subcombination of simply a sunshade and a fastener which may be used to both align an existing headliner and to provide support for the headliner and the fastener. This combination does not provide for the substrate to be sandwiched between the cover and the base. As may be seen in FIG. 4A, the components are essentially the same as those of the fastener of FIG. 4 and use the same reference numerals to refer thereto. Cover 150 includes flanges 154 and 152 which engage the upward side of A-pillar inner 108. Base 170 includes an outwardly extending bezel which engages substrate 12 as the fastener is assembled. Pivot rod 136, projection receiving secondary visor 176, and opening 179 are also shown.

Further as may be seen in the various Figures, wires 168 exit the fastener through wire opening area 167. Hence, it may be seen in combination with FIG. 4A and FIG. 3A that various manner in which the wires transverse the fastener such that they may be connected to the modular headliner wire assembly.

As further can be seen in FIG. 4A, the entire fastener may be assembled including the sunshade assembled thereto, and then the fastener inserted through an opening in the substrate and then inserted through an opening in the sheet metal structure such that the substrate and sunshade to which the fastener is attached are both secured to the sheet metal structure.

Although not specifically apparent in FIGS. 3 or 4A, centering arms 174 extend upwardly within A-pillar opening 112 or a similar opening, however, they are not in alignment with flanges 154 and 152. Hence, flanges 154 and 152 act independently of the centering arms to snap into position regardless of location of the centering arms. In this manner, the free compression and expansion of the flanges as the fastener is displaced through the opening are not impacted by the centering arms.

Figure 5:
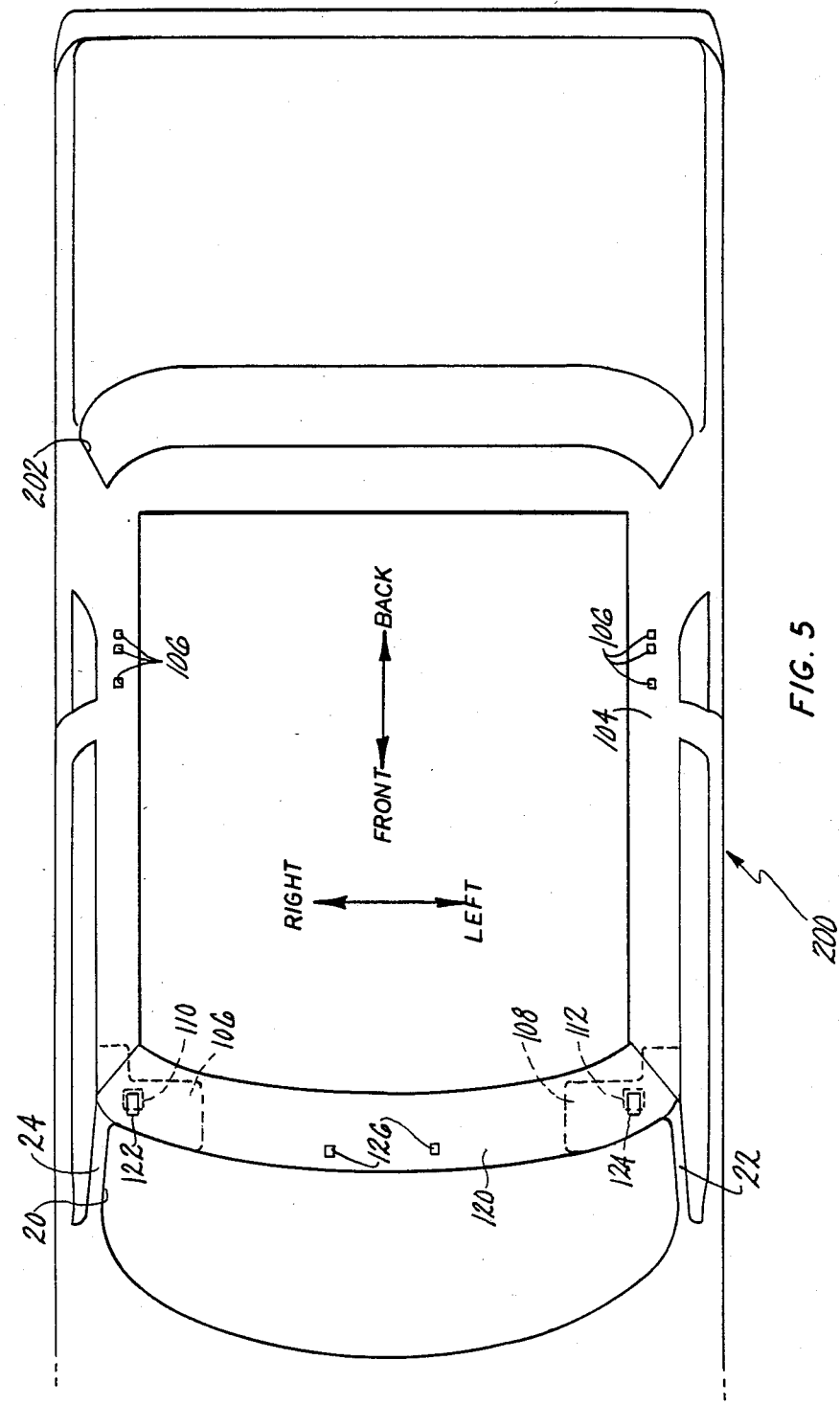
FIG. 5 is a top view of the vehicle body structure showing the mounting locations for a modular headliner.

FIG. 5 is a top view of a motor vehicle body structure. Specifically, there may be seen windshield opening 20, and rear window opening 202 of motor vehicle 200. Left A-pillar inner 108 is shown defining left A-pillar opening 112. Right A-pillar 106 is shown defining right A-pillar opening 110. Header 120 is shown having header openings 112, 122 and header inboard sunshade support openings 126. Additionally, side rails 104 are shown having openings 106. Additionally, various arrows are shown to indicate the left/right direction and the front/back directions relative to the vehicle.

When the modular headliner is assembled, fasteners 44 are displaced upwardly through various openings. A fastener will be displaced upwardly until the cover first engages the A-pillar inner 108. The operator will then through displacement of the angled end of cover 150 be able to feel when cover 150 enters into inner opening 112. The operator then displaces the modular headliner upwardly until the flanges pass through opening 112 and snap outwardly to engage the modular headliner to the vehicle body structure.

However, since the left A-pillar inner and the right A-pillar inner are two entirely separately distinct pieces of sheet metal which are assembled to the vehicle and are subject to manufacturing tolerances and variations, the relative positioning between the two is not always maintained constant. On the other hand, header 120 is a single stamping and contains a plurality of openings which are all fixed relative to one another. However, the header itself may not be necessarily secured to the A-pillar inners and the rest of the vehicle body structure always in the same position. Hence, the combination of openings overlapping one another, A-pillar opening 112 and header opening 124 and A-pillar opening 110 and header opening 122 are shown. In this manner, each opening acts to secure the displacement of the modular headliner in a single direction, but not the other direction whereby flexibility may be obtained in the manner in which the modular headliner is mounted. This flexibility is necessary to compensate for the various tolerance and variances during the assembly of the vehicle. In this manner, a single fastener may first be mounted to the vehicle structure and the modular headliner thereafter be pivoted to mate with the other openings while the entire modular headliner is aligned relative to the vehicle. By providing these sliding arrangements, a snap-fit fastening arrangement may be utilized to assemble the entire modular headliner. If no provision for relative displacement were provided, the vehicle build would have to have precise tolerances on the openings, presently unattainable, or some other method of adjusting the positioning of the modular headliner relative to the vehicle body structure would be necessary. However, with the provision of overlapping holes for allowing for sliding fits between the fastener and the combination of the headliner and the header of the A-pillar inner and the header, a snap-fit relationship is possible.

As may be specifically seen from FIGS. 2, 5 and 4, this various combination acts to allow a fastener to be inserted with the centering arms 174 securing the fastener relative to A-pillar opening 112, such that the fastener may be displaced in the left/right direction as shown in FIG. 5, but not the front/back direction. However, the cover is appropriately sized such that the cover is not retained in the left/right direction by the header opening such that relative to the header, the assembly may be slid in the left/right direction. However, the cover is sized in the front/back direction relative to the header opening such that the cover may not be slid in the front/back direction. Consequently, one opening for each fastener acts to maintain the modular headliner in the desired position at that location. Consequently, variations between the A-pillar inner and the header are accommodated without skewing the entire headliner module.

The invention has been described with reference to a particular embodiment. It is to be understood by those skilled in the art that variations and modifications can be made within the spirit and scope of the invention.

We claim:

1. A snap-in modular headliner assembly for use with a motor vehicle which comprises:
   a headliner substrate formed to fit within the interior of the motor vehicle;
   a first sunshade assembly;
   a second sunshade assembly;
   a first sunshade fastener mounted to the substrate and including means for securing the first sunshade thereto and first snap-in fastener means extending therefrom;
   a second sunshade fastener mounted to the substrate and including means for securing the second sunshade thereto and second snap-in fastener means extending therefrom; and
   snap-in fastener receiving means in the motor vehicle for receiving said second snap-in fastener means.

2. The apparatus as set forth in claim 1 and further comprising:
   an accessory mounted to the substrate and including snap-fit accessory mounting means extending therefrom.

3. The apparatus as set forth in claim 2 wherein the accessory further comprises an assist handle assembly and the snap-fit accessory mounting means includes a pair of extending flexible snap-fit legs.

4. The apparatus as set forth in claim 2 wherein the accessory includes a pair of accessories, each mounted on separate sides of the substrate.

5. The apparatus as set forth in claim 1 and further comprising at least one console affixed to the substrate.

6. The apparatus as set forth in claim 5 wherein the console includes a lamp assembly.

7. The apparatus as set forth in claim 1 and further comprising an electrically conductive wire assembly mounted to the headliner substrate.

8. The apparatus as set forth in claim 1 and further comprising a first inboard sunshade fastener mounted to the substrate for securing the inboard end of the first sunshade assembly and including snap-fit legs extending therefrom and a second inboard sunshade fastener mounted to the substrate for securing the inboard end of the second sunshade fastener and including snap-fit legs extending therefrom.

9. The apparatus as set forth in claim 5 wherein said console includes fastening means extending therefrom for engaging compatible fastening means mounted to the motor vehicle.

10. A modular headliner assembly which may be mounted within a motor vehicle as a single module which comprises:
    a substrate formed to fit within the desired space within the motor vehicle, said substrate including a decorative surface facing the interior of the vehicle and a non-show surface;
    a first sunshade affixed to the substrate and positioned to serve as the front seat driver side sunshade when the headliner assembly is mounted to the vehicle;
    a second sunshade affixed to the substrate and positioned to serve as the front seat passenger side sunshade when the headliner assembly is mounted to the vehicle; and
    first means associated with each sunshade for engaging the vehicle for holding the substrate in position; and
    second means on the vehicle for receiving said first means.

11. The apparatus as set forth in claim 10 and further comprising a console mounted to the substrate.

12. The apparatus as set forth in claim 1 wherein the console includes a lamp module having lighting means and switch means for selectively energizing the lighting means.

13. The apparatus as set forth in claim 12 wherein the headliner assembly further comprises a wiring assembly, said wiring assembly being connected to the lighting means.

14. The apparatus as set forth in claim 10 and further comprising at least one assist strap mounted to the substrate and positioned to serve as a grab handle for a vehicle passenger when the headliner assembly is mounted to the vehicle.

15. The apparatus as set forth in claim 10 and further comprising other accessories mounted to the substrate.

16. The apparatus as set forth in claim 10 and further comprising snap-fit means mounted to the substrate, said snap-fit means including projecting snap-in fasteners which serve to secure the headliner assembly to the motor vehicle, and snap-in fastener means in the motor vehicle for receiving second snap-in fastener means.

17. The apparatus as set forth in claim 16 and further comprising a first sunshade fastener affixed to the substrate including means for mounting the first sunshade to the first sunshade fastener and including a first projecting snap-in fastener extending from the non-show surface of the substrate.

18. The apparatus as set forth in claim 17 and further comprising a second sunshade fastener affixed to the substrate including means for mounting the second sunshade to the second sunshade fastener and including a second projecting snap-in fastener extending from the non-show surface of the substrate.

19. The apparatus as set forth in claim 16 and further comprising accessories mounted to the substrate, said accessories including projecting snap-in fasteners extending from the non-show surface of the substrate.

20. The apparatus as set forth in claim 19 wherein the accessories comprise assist handles or coat hooks.

21. A modular headliner assembly which may be installed as a single unit within a motor vehicle wherein the motor vehicle includes a body structure having at least one member which defines fastener receiving openings which comprises:

a substrate formed to fit within the desired space within the motor vehicle adjacent the body structure wherein the fastener receiving openings are located, said substrate having a decorative surface exposed to the occupants of the motor vehicle after the headliner assembly is assembled to the motor vehicle and a non-show surface facing the body structure wherein the fastener receiving openings are located; and snap-fit fastener means mounted to the substrate and including snap-fit fastener projecting portions sized and positioned to mate with the fastener receiving openings upon assembly of the headliner assembly to the motor vehicle.

22. The apparatus as set forth in claim 21 and further comprising at least a pair of sunshades and wherein the snap-fit fastener means further comprises means to mount the sunshades to the substrate.

23. The apparatus as set forth in claim 21 wherein the snap-fit fastener means comprises an assist handle mounted to the substrate, said assist handle including snap-fit fastener projecting portions for mating with appropriate fastener receiving openings upon assembly of the headliner assembly to the motor vehicle.

24. A method of mounting a modular headliner assembly including a substrate having snap-fit fastener means mounted thereto which includes snap-fit fastener projecting portions, a partially assembled motor vehicle including a body structure having at least one member which defines fastener receiving openings said motor vehicle also having large window openings, which comprises the steps of:

aligning the modular headliner assembly with a large window opening of the motor vehicle;

inserting the modular headliner assembly through the large window opening;

aligning the snap-fit projecting portions of the modular headliner assembly with the fastener receiving openings of the body structure; and displacing the projecting portions of the headliner assembly into the receiving openings of the body structure to secure the modular headliner assembly to the body structure.

25. The method as set forth in claim 24 wherein the modular headliner assembly further includes a wire assembly having a connector mounted thereto and wherein the motor vehicle also includes a wire assembly having a mating connector and wherein the method further comprises the step of assembling the connector of headliner wire assembly to the mating connector of the motor vehicle wire assembly.

26. The method as set forth in claim 24 and further comprising the step of sensing that the projecting portions of the headliner assembly have been fully displaced into the openings of the body structure.

27. The method as set forth in claim 24 and further comprising the step of driving a mandrel means adjacent at least one of the projecting portions to lock said projecting portion in engagement with the body structure adjacent the fastener receiving opening.

28. A method of mounting a modular headliner assembly including a first sunshade fastener having a snap-fit portion, a second sunshade fastener having a snap-fit portion and an accessory having a snap-fit portion to a partially assembled motor vehicle including a body structure defining fastener receiving openings and a large window opening which comprises the steps of:

inserting the modular headliner assembly through the large window opening and aligning the various snap-fit portions with the appropriate fastener receiving openings;

snapping the snap-fit fastener of the first sunshade fastener into the assembled position;

snapping the snap-fit fastener of the second sunshade fastener into the assembled portion; and snapping the snap-fit portion of the accessory into the assembled position whereby the headliner assembly is retained at its desired position relative to the body structure.

29. The method as set forth in claim 28 wherein the accessory includes a first accessory and a second accessory, one located on either side of the assembly and wherein the step of snapping the snap-fit portion of the accessory includes snapping the snap-fit portion of the first accessory and then snapping the snap-fit portion of the second accessory.

30. The method as set forth in claim 28 wherein the accessory includes a snap-fit portion having a pair of spaced legs which may be inserted through the fastener receiving opening and a mandrel and further comprising the step of:

driving the mandrel between the pair of spaced legs to lock the legs to the body structure adjacent the fastener receiving opening.

31. The method as set forth in claim 28 wherein the modular headliner assembly further includes a first inboard sunshade fastener and a second inboard sunshade fastener each having a snap-fit portion, and further comprising the steps of:

snapping the snap-fit portion of the first inboard sunshade fastener into the assembled position; and snapping the snap-fit portion of the second inboard sunshade fastener into the assembled position.

32. The method as set forth in claim 28 and further comprising the step of sensing that the snap-fit portions are fully secured within the fastener receiving openings.

33. The method as set forth in claim 28 wherein in each instance the step of snapping further comprises applying a force to the appropriate portion of the headliner assembly to displace the assembly to achieve the desired reaction.

34. The method as set forth in claim 33 wherein the step of applying a force further comprises striking the headliner assembly with the hand of an assembler.

* * * * *